(12) United States Patent
Kim

(10) Patent No.: US 11,535,820 B2
(45) Date of Patent: Dec. 27, 2022

(54) MANUFACTURING METHOD OF GRAPE WINE VINEGAR, AND GRAPE WINE VINEGAR USING BY THE SAME

(71) Applicant: VINEKO ARGO CO., LTD., Pocheon-si (KR)

(72) Inventor: Sung Mi Kim, Pocheon-si (KR)

(73) Assignee: VINEKO ARGO CO., LTD., Pocheon-si (KR)

( * ) Notice: Subject to any disclaimer, the term of this patent is extended or adjusted under 35 U.S.C. 154(b) by 429 days.

(21) Appl. No.: 16/621,355

(22) PCT Filed: Jun. 13, 2019

(86) PCT No.: PCT/KR2019/007119
§ 371 (c)(1),
(2) Date: Dec. 11, 2019

(87) PCT Pub. No.: WO2019/240506
PCT Pub. Date: Dec. 19, 2019

(65) Prior Publication Data
US 2020/0339923 A1 Oct. 29, 2020

(30) Foreign Application Priority Data
Jun. 15, 2018 (KR) .................. 10-2018-0068577

(51) Int. Cl.
*C12J 1/02* (2006.01)
*C12H 1/22* (2006.01)
(52) U.S. Cl.
CPC . *C12J 1/02* (2013.01); *C12H 1/22* (2013.01)

(58) Field of Classification Search
CPC .................................. C12J 1/02; C12H 1/22
See application file for complete search history.

(56) References Cited

FOREIGN PATENT DOCUMENTS

| CN | 107828623 A | 3/2018 |
|---|---|---|
| KR | 10-1999-0078887 A | 11/1999 |
| KR | 10-2012-0102478 A | 9/2012 |
| KR | 10-2017-0060370 A | 6/2017 |
| KR | 10-1947475 B1 | 2/2019 |

OTHER PUBLICATIONS

Grape Wine & Grape Vinegar Making Googletranslation from Korean Sep. 18, 2017 [출처] 포도와 인&포도식초 만들기|작성자 써니짱 https://blog.naver.com/ys717/221099237519 (Year: 2017).*
Machine translation of KR 10-2017-0060370 (Year: 2017).*
URL:https://blog.naver.com/ys717/221099237519, Naver Bloq, Sep. 18, 2017, pp. 1-9.

\* cited by examiner

*Primary Examiner* — Vera Stulii
(74) *Attorney, Agent, or Firm* — Rabin & Berdo, P.C.

(57) ABSTRACT

Disclosed is a method for preparing a grape wine vinegar and a grape wine vinegar using the same, and more particularly a preparation method for grape wine vinegar and a grape wine vinegar using the same, which involves performing an alcoholic fermentation using grapes and yeast, followed by an aging process, and then introducing a vinegar starter into grape wine to cause an acetic fermentation, thereby creating a grape wine vinegar with improved taste and flavor and many health benefits due to high contents of organic acid and antioxidant components in addition to the ether component of grapes.

4 Claims, 5 Drawing Sheets

I. Analysis Procedure
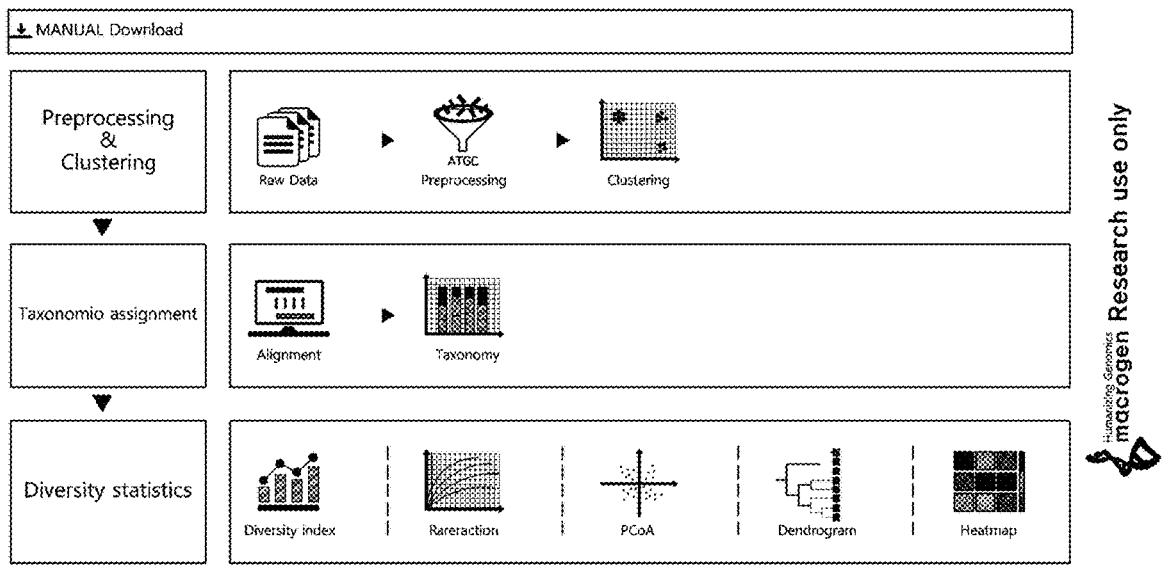
FIG. 2

 macrogen NGS Analysis Report - OTU o Taxonomic assignment

- The following chart shows the taxonomic composition for each sample from phylum to genus levels (x-axis: sample name; y-axis: OTU proportions).
You can mouse over the plot to see which taxa are contributing to the percentage shown

| phylum | Class | Order | Family | Genus | species |

· Species Level
View Figure (.pdf) View Legend (.pdf)

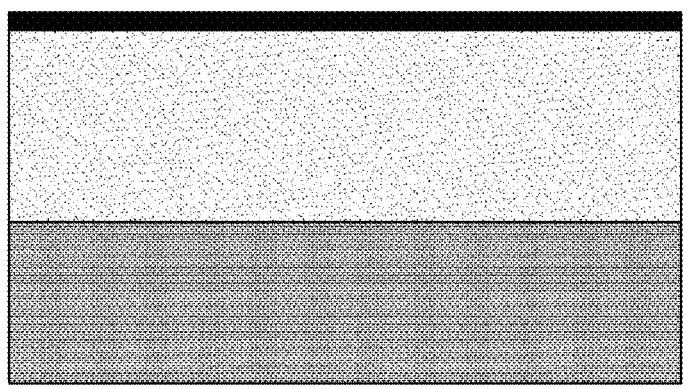

View Table (.txt)

| Legend | Taxonomy | Total Count | % | vineko % |
|---|---|---|---|---|
| | Archaea;__Thaumarchaeota;__;__;__Nitrososphaera;__Nitrososphaera viennensis | 0 | 0.0% | 0.0% |
| | Bacteria;__Actinobacteria;__;__;__Tomitella;__Tomitella biformata | 0 | 0.0% | 0.0% |
| | Bacteria;__Actinobacteria;__;__Bifidobacteriales;__Bifidobacteriaceae;__Bifidobacterium;__Bifidobacterium animalis | 0 | 43.1% | 43.1% |
| | Bacteria;__Actinobacteria;__;__Bifidobacteriales;__Bifidobacteriaceae;__Bifidobacterium;__Bifidobacterium breve | 0 | 0.1% | 0.1% |
| | Bacteria;__Actinobacteria;__;__Bifidobacteriales;__Bifidobacteriaceae;__Bifidobacterium;__Bifidobacterium dentium | 0 | 0.1% | 0.1% |
| | Bacteria;__Actinobacteria;__;__Bifidobacteriales;__Bifidobacteriaceae;__Bifidobacterium;__Bifidobacterium longum | 0 | 0.1% | 0.1% |
| | Bacteria;__Cyanobacteria;__;__;__Chroococcidiopsis;__Chroococcidiopsis thermalis | 0 | 0.0% | 0.0% |
| | Bacteria;__Firmicutes;__Bacilli;__Lactobacillales;__Lactobacillaceae;__Lactobacillus;__Lactobacillus acidophilus | 0 | 51.2% | 51.2% |
| | Bacteria;__Firmicutes;__Bacilli;__Lactobacillales;__Lactobacillaceae;__Lactobacillus;__Lactobacillus gasseri | 0 | 0.0% | 0.0% |
| | Bacteria;__Firmicutes;__Bacilli;__Lactobacillales;__Lactobacillaceae;__Lactobacillus;__Lactobacillus plajomi | 0 | 0.2% | 0.2% |
| | Bacteria;__Firmicutes;__Bacilli;__Lactobacillales;__Lactobacillaceae;__Lactobacillus;__Lactobacillus rhamnosus | 0 | 4.2% | 4.2% |
| | Bacteria;__Firmicutes;__Bacilli;__Lactobacillales;__Lactobacillaceae;__Lactobacillus;__Lactobacillus rhamnosus | 0 | 0.0% | 0.0% |
| | Bacteria;__Proteobacteria;__Epsilonproteobacteria;__Campylobacterales;__Campylobacteraceae;__Arcobacter;__Arcobacter aquimarinus | 0 | 0.0% | 0.0% |
| | Bacteria;__Proteobacteria;__Gammaproteobacteria;__;__;__Edwardsiella;__Edwardsiella piscicida | 0 | 0.0% | 0.0% |
| | Bacteria;__Proteobacteria;__Gammaproteobacteria;__;__Enterobacteriaceae;__Escherichia;__Escherichia fergusonii | 0 | 0.0% | 0.0% |
| | Bacteria;__Proteobacteria;__Gammaproteobacteria;__;__Enterobacteriaceae;__Moraxellaceae;__;__Moraxella osloensis | 0 | 0.0% | 0.0% |

FIG. 3

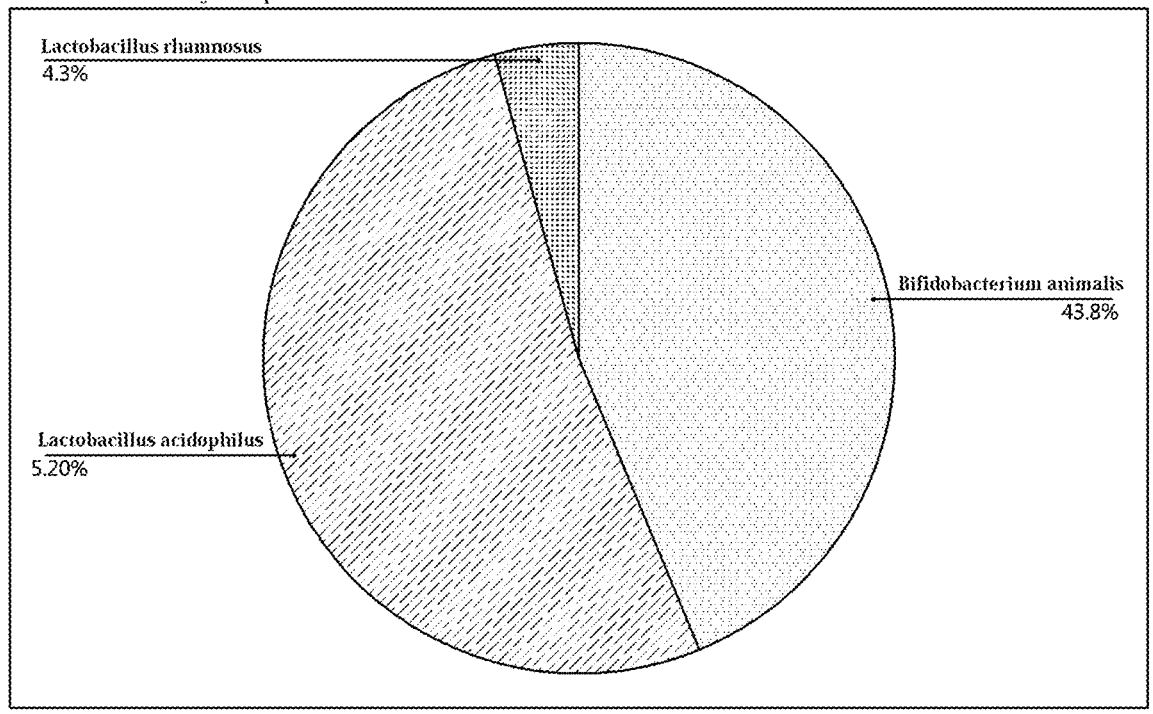

Bifidobacterium animalis
Benefits:
- Helps prevent diarrhea.

Lactobacillus acidophilus
Benefits:
- Prevents atopic dermatitis, skin diseases, allergy, and aspiratory infections.
- Helps inhibit Helicobacter pylori causing gastric ulcer.
- Prevents diarrhea and constipation.
- Has highest viability among lactobacillus bacteria.

Lactobacillus rhamnosus
Benefits:
- Relieves the symptoms of kidney diseases
- Helps strengthen the immune system.
- Reportedly has a beneficial effect on the chronic urinary track infection of menopausal women.

FIG. 4

MANUFACTURING METHOD OF GRAPE WINE VINEGAR, AND GRAPE WINE VINEGAR USING BY THE SAME

TECHNICAL FIELD

The present invention relates to a wine vinegar, particularly to a grape wine vinegar made from grape wines, and more particularly to a grape wine vinegar and its preparation method that is linked to the production of grape wine followed by the acetic fermentation with a vinegar starter.

BACKGROUND ART

Wine, the collective name for fruit wine, commonly refers to grape wine. What Koreans call wine is, on the other hand, alcoholic beverages made from plants or fruits. Depending on the base plant or fruit used, the wine can produce its characteristic color, aroma, and taste. A good harmony between taste and aroma results in fine wines with a good flavor. The aroma of wine is especially a crucial factor to the quality and acceptability of wine products, one of the most important keys in determining the quality of wine, including the quality rating, the degree of aging, etc. As a matter of fact, the wine with a good flavor has a great effect on the production of wine-fermented vinegar.

The word vinegar derives from the Old French word "vinaigre", a compound of "vin (wine)" and "aigre (sour)", as it suggests that vinegar is made from grape wine using acetic fermentation. In this connection, the areas famous for the quality of wine products are also famous for the production of wine vinegars. Accordingly, the term "grape wine vinegar" as used herein refers to vinegar obtained by the fermentation of wine made from grapes.

"Donguibogam (Principles and Practices of Eastern Medicine)" states that vinegar is innoxious, tastes sour, makes our body warm, removes furuncles and other abscesses including hard lumps, remedies puerperal vertigo and any kind of vertigo from profuse bleeding, cardiac diseases, and stress diseases, helps soothe a sore throat, and detoxifies toxins in foods such as fish, meats, medicinal herbs, or wild edible greens. That's why vinegar has been known from ancient times to have loads of health benefits.

There are lots of health benefits of vinegar: (1) High in organic acids like acetic acid, citric acids, etc. and helps absorb minerals and vitamins. (2) Helps remove lactic acid buildup in muscle and recover from fatigue. (3) Supports production of corticosteroids and detoxification of liver. (4) Prevents or improves hardening of the arteries and reduces blood pressure. (5) Aids in blood circulation and metabolism to make the body younger. (6) Removes extra nutrients to prevent or improve obesity due to a reduced caloric intake. (7) Improves the functions of intestines and makes the skin healthy. (8) Has a diuretic effect to help rid the body of excess sodium and maintain the blood clean. (9) Useful as an antiseptic and antibiotic with its excellent antibacterial properties. (10) Helps the body fluids become less alkaline to boost the life energy. As all these beneficial functions of vinegar are widely known, the consumption of vinegar for the purpose of skin care, health promotion, weight loss, or the like is on the rise. Yet, the vinegars using natural ingredients are much preferred to the synthetic vinegars of which the harmful risks are being disclosed.

As a prior art related to the present invention, a wine vinegar and its preparation method is disclosed in Korean Patent No. 10-1781839, which relates to a method of preparing a wine vinegar by adding yeast to a grape filtrate using grapes not of merchantable quality to prepare an alcohol fermented solution and then introducing acetic acid bacteria, members of the genus *Acetobacter*, to activate acetic fermentation and create a wine vinegar. Another prior art related to the present invention is stated in Korean Patent No. 10-1416174 under the title of "A grape vinegar with an anticancer effect and its preparation method", which relates to a method of preparing a vinegar that includes activating alcoholic fermentation using grapes and then introducing acetic acid bacteria, members of the genus *Acetobacter*, into the resultant alcohol fermented solution to activate acetic fermentation and create a vinegar.

DISCLOSURE OF INVENTION

Technical Problem

It is an object of the present invention to perform aging of vinegar to improve taste and aroma to a deeper level with the ether components of grapes and to acquire high acceptability with high contents of organic acid and antioxidant components.

It is another object of the present invention to provide a method for preparing high-quality grape wine vinegar with a sweet taste.

Technical Solution

To achieve the objects of the present invention, there is provided a method for preparing a grape wine vinegar that includes: (S10) preparing crushed grapes; (S20) sprinkling yeast over the prepped grapes, storing in a fermentation chamber at 20 to 30° C. for 20 to 30 hours to allow proliferation of the yeast, and then tossing the grapes and the yeast to mix once to five times daily over 5 to 10 days to cause an alcoholic fermentation for 20 to 30 days; (S30) straining off a resultant alcoholic fermentation stock to obtain a grape wine portion, aging the grape wine portion for 10 to 16 months, and then separating wine by sedimentation; (S40) introducing a vinegar starter into the separated wine to cause an acetic fermentation; and (S50) aging a resultant acetic fermentation stock for 2 to 8 months.

In one aspect, the acetic fermentation step S40 preferably includes: pouring the separated wine into a narrow-mouthed container, introducing a vinegar starter in an amount 0.25 to 0.75 times the volume of the separated wine to acquire an alcohol-by-volume of 7 to 9%, and then allowing an acetic fermentation to occur for 20 to 40 days.

Preferably, the vinegar starter is prepared in steps of: (S45) adding sugar to the crushed grapes to a Brix value of 20 to 30, sprinkling yeast over the grapes, storing in a fermentation chamber at 20 to 30° C. for 20 to 30 hours to allow proliferation of the yeast, and tossing the grapes and the yeast to mix once to five times daily over 5 to 10 days to cause an alcoholic fermentation in a sealed condition for 20 to 30 days; and (S46) straining off a resultant alcoholic fermentation stock of the step S45 to obtain a grape wine portion, aging the grape wine portion for 20 to 40 days, and sealing the container when percent acidity reaches 5% or above to allow an aging for 10 to 16 months.

Preferably, the grape prep step S10 may include crushing the grapes to remove stems, placing the crushed grapes in a container, and adding sugar to a Brix value of 24. Preferably, the alcoholic fermentation step S20 may include sprinkling yeast over the prepped grapes, storing in a fermentation chamber at 25° C. for 24 hours to allow proliferation of the yeast, and then tossing the grapes and the yeast to mix twice a day over 7 days to cause an alcoholic fermentation for 30 days.

Preferably, the wine separation step S30 may include straining off a resultant alcoholic fermentation stock to obtain a grape wine portion, performing a first aging of the grape wine portion for 3 months and a first filtration, and allowing a second aging in a sealed aging container for one year and a second filtration using a sediment filtration. Preferably, the acetic fermentation step S40 may include pouring the separated wine into a narrow-mouthed container, introducing a vinegar starter in an amount 0.5 times the volume of the separated wine to make about 20% room in a glass bottle and acquire an alcohol-by-volume of 8%, and then opening and closing a bottle lid once or twice a day over 30 days to cause an acetic fermentation to occur.

Finally, the aging step S50 may preferably include closing the lid to cut off oxygen and cause an aging to occur for 6 months when the percent acidity of the acetic fermentation stock is 6% or above, performing a third filtration using a sediment filtration, allowing another aging for 2 months, and then performing a fourth filtration.

Effects of Invention

As stated above, the present invention involves performing an alcoholic fermentation using grapes and yeast, followed by an aging process, and then introducing a vinegar starter into grape wine to cause an acetic fermentation, thereby creating a grape wine vinegar with improved taste due to high contents of organic acid and antioxidant components in addition to the ether component of grapes.

In addition, the present invention provides a high-quality grape wine vinegar with a sweet taste and its preparation method.

BRIEF DESCRIPTION OF DRAWINGS

FIG. 2 is a human microbiome analysis report concerning the grape wine vinegar prepared according to Example 1 of the present invention;

FIG. 3 shows the results of an analysis on the human microbiome in association with the grape wine vinegar prepared according to Example 1 of the present invention;

FIG. 4 shows the distribution chart of the human microbiome and the efficacies of the individual lactic ferments in association with the grape wine vinegar prepared according to Example 1 of the present invention.

BEST MODES FOR CARRYING OUT THE INVENTION

Figure 1:
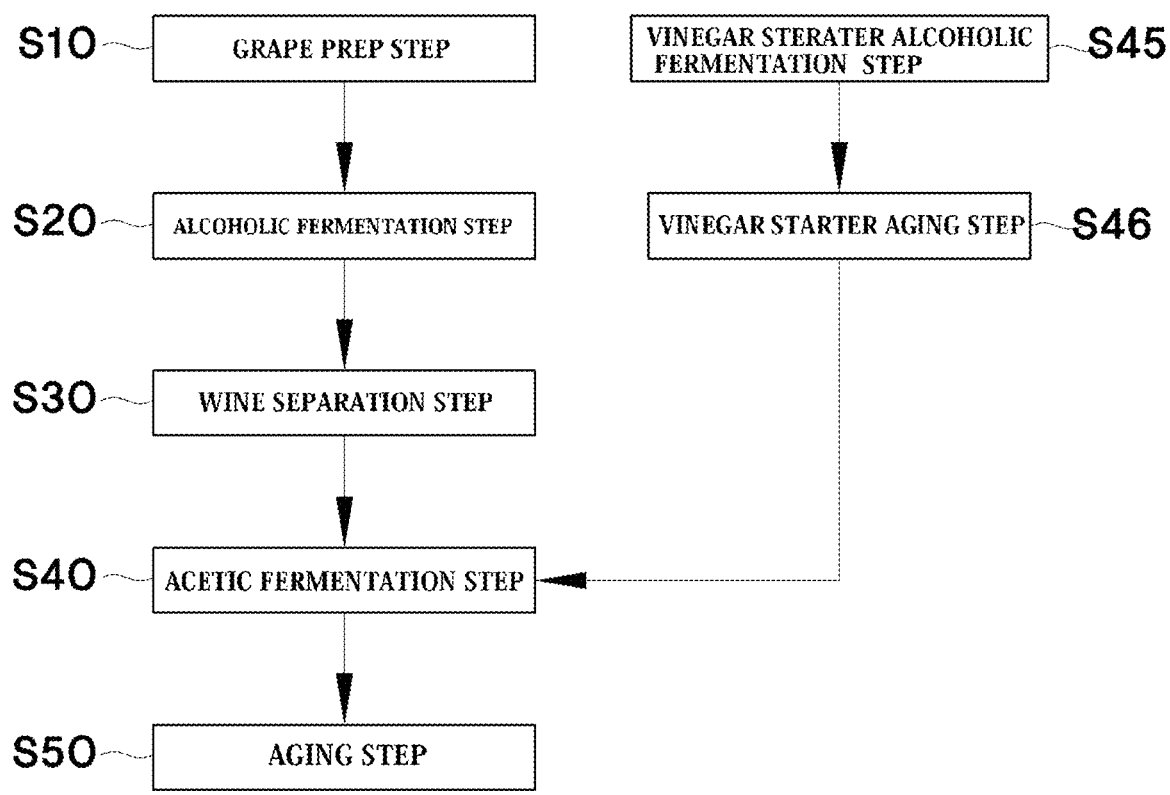
FIG. 1 is a flow chart showing a preparation method for a grape wine vinegar prepared according to one embodiment of the present invention.
Figure 5:
FIG. 5 shows the evaluation practice and the sensory evaluation survey form for the quality assessment of the grape wine vinegar prepared according to one embodiment of the present invention.

As the present invention allows for various changes and numerous embodiments, particular embodiments will be illustrated in the drawings and described in detail. However, the present invention is not limited to the specific embodiments and should be construed as including all the changes, equivalents, and substitutions included in the spirit and scope of the present invention. Further, in the following description of the present invention, a detailed description of known functions and configurations incorporated herein will be omitted when it may make the subject matter of the present invention rather unclear.

The terminology used herein is for the purpose of describing an embodiment only and is not intended to be limiting of an exemplary embodiment. As used herein, the singular forms are intended to include the plural forms as well, unless the context clearly indicates otherwise. It will be further understood that the terms "comprises" and/or "comprising" or "has/have" and/or "having" when used in this specification, specify the presence of stated component, step, operation, element, or a combination thereof but do not preclude the presence or addition of one or more other components, steps, operations, elements, and/or combinations thereof.

Although ordinal numbers such as "first", "second", and so forth will be used to describe various components, those components are not limited by the terms. The terms are used only for distinguishing one component from another component.

Hereinafter, the present invention will be described in detail.

The present invention is to provide a grape wine vinegar with high contents of organic acid and antioxidant components in addition to the ether component of grapes and enhanced taste and aroma by performing an alcoholic fermentation using grapes and yeast, followed by an aging process, and then introducing a vinegar starter into grape wine to cause an acetic fermentation.

FIG. 1 is a flow chart showing a preparation method for a grape wine vinegar prepared according to one embodiment of the present invention.

In order to achieve the objects of the present invention, as illustrated in FIG. 1, the present invention includes a grape prep step S10, an alcoholic fermentation step S20, a wine separation step S30, an acetic fermentation step S40, and an aging step S50.

For the preparation of a vinegar starter used in the acetic fermentation step S40, the present invention may further include, as shown in FIG. 1, a vinegar starter alcoholic fermentation step S45 and a vinegar starter aging step S46.

The grape prep step S10 is a step of prepping crushed grapes. The procedure for prepping crushed grapes is not specifically limited. For example, grapes are crushed to remove stems and placed in a container, and sugar is preferably added to the crushed grapes to a Brix value of 20 to 30, more preferably 24.

Preferably, the grapes as used herein may include, but are not limited to, Campbell Early grape. The Campbell Early grape, bred in the States in 1892 and introduced to Korea in 1908, is also called Campbell Early.

When sugar is added to a Brix value below 20, it allows the entry of spoilage bacteria to interrupt the proliferation of acetic acid bacteria; and when a Brix value exceeds 30 with the addition of sugar, the yeast becomes incapable of activating an alcoholic fermentation with efficiency. Hence, the most preferable Brix value is about 24 at which level it is possible to prevent the entry of spoilage bacteria and enable the yeast to produce alcohol with stability.

The alcoholic fermentation step S20 is a step of sprinkling yeast over the prepped grapes of the step S10 to allow the yeast to proliferate over the grapes and tossing the grapes and the yeast to mix to cause an alcoholic fermentation. It may be possible to place the prepped grapes in a defined container, sprinkle yeast over the grapes to allow proliferation of the yeast, and then toss the grapes and the yeast to mix.

Preferably, for example, the grapes prepped in the step S10 with the yeast sprinkled over are stored in a fermentation chamber at 20 to 30° C. for 20 to 30 hours to allow proliferation of the yeast, and the grapes and the yeast are then tossed to mix once to 5 times daily over 5 to 10 days to cause an alcoholic fermentation for 20 to 30 days. More preferably, the grapes prepped in the step S10 with the yeast sprinkled over are stored in a fermentation chamber at 25° C. for 24 hours to allow proliferation of the yeast, and the grapes and the yeast are then tossed to mix twice a day over 7 days to cause an alcoholic fermentation for 30 days.

The fermentation temperature of the fermentation chamber below 20° C. results in low efficiency of alcohol production using the yeast; and the fermentation temperature above 30° C. accelerates the fermentation process to cause relative deterioration in taste and aroma. Accordingly, it is most preferable to have a fermentation temperature of about 25° C.

In addition, the fermentation period in the fermentation chamber less than 20 hours leads to insufficient proliferation of the yeast; and the fermentation period longer than 30 hours makes the yeast incapable of activating an alcoholic fermentation. It is therefore most preferable to have a fermentation period of about 25 hours.

Tossing the grapes and the yeast to mix twice daily over 7 days is to help the microorganisms of the grapes get in contact with the yeast to allow lactic acid fermentation and alcoholic fermentation to occur with efficiency. The alcoholic fermentation is conducted in the sealed condition throughout the procedures other than the process of tossing the grapes and the yeast to mix. The entry of air possibly occurring during the process of tossing the grapes and the yeast to mix does not make a great effect on the alcoholic fermentation.

Preferably, the final alcohol-by-volume (ABV) of the resultant alcoholic fermentation stock in the step S20 may be, but is not limited to, 11 to 13%.

The wine separation step S30 is a step of straining off the resultant alcoholic fermentation stock to obtain a grape wine portion and then performing an aging and a separation of the grape wine portion. The method of straining off the alcoholic fermentation stock and separating the grape wine portion is not specifically limited. Likewise, the aging and separation of the grape wine portion may be conducted according to any known method in the related art.

Preferably, the resultant alcoholic fermentation stock obtained in the step S20 is, for example, strained off to isolate a grape wine portion, and the grape wine portion is subjected to an aging over 10 to 16 months and then an isolation of wine by sedimentation. More preferably, the resultant alcoholic fermentation stock of the step S20 is strained off to isolate a grape wine portion, and the grape wine portion is subjected to a first aging for 3 months, a first filtration, a second aging in a sealed aging container over one year, and then a second filtration, that is, a sediment filtration, to isolate wine.

Aging in a sealed aging container is to produce human microbiome. As the human microbiome is anaerobic, it is very effective to conduct the aging process in a sealed condition with the entry of oxygen cut off.

The grape wine aging of the step S30 is a low-temperature aging, so the aging temperature is preferable about 17° C. The aging temperature below 17° C. greatly retards the growth of the human microbiome; and the aging temperature above 17° C. undesirably makes the acetic acid bacteria keep on fermentation and eventually cause reacidification to deteriorate the taste and aroma of the grape wine.

The period of the second aging is preferably 10 to 16 months, more preferably one year. The second aging having an aging period less than 10 months ends up with insufficient production of ether components in the grapes and ensures less aroma; and the aging period of the second aging longer than 16 months has an undesirable effect on the production efficiency and results in changing aroma to deteriorate the taste and flavor of the grape wine.

The acetic fermentation step S40 is a step of introducing a vinegar starter into the separated wine of the step S30. The method of introducing a vinegar starter into the separated wine is not specifically limited, so it may be possible to adopt any one of methods and/or vinegar starters known in the related art.

Preferably, the separated wine of the step S30 is, for example, poured into a narrow-mouthed container, and a vinegar starter in an amount 0.25 to 0.75 times the volume of the separated wine is introduced into the separated wine to acquire an alcohol-by-volume (ABV) of 7 to 9%, after which an acetic fermentation is allowed to occur for 20 to 40 days. More preferably, the separated wine of the step S30 is poured into a narrow-mouthed container; a vinegar starter is introduced in an amount 0.5 times the volume of the separated wine to make about 20% room in a glass bottle and acquire an alcohol-by-volume (ABV) of 8%; and a bottle lid is then opened and closed once or twice daily over 30 days to cause an acetic fermentation to occur.

Undesirably, introducing a vinegar starter in an amount less than 0.25 times the volume of the separated wine results in insufficient acetic fermentation; and introducing a vinegar starter in an amount greater than 0.75 times the volume of the separated wine makes an adverse effect on the production efficiency and causes deterioration in flavor.

The alcohol-by-volume (ABV) of the wine incorporated with the vinegar starter is preferably adjusted to 7 to 9%, more preferably 8%. When the ABV value is less than 7%, it allows the entry of spoilage bacteria to interrupt the proliferation of acetic acid bacteria and cause spoilage; and when the ABV value exceeds %, it is so high as to kill all the acetic acid bacteria immediately after they proliferate.

The period of the acetic fermentation is preferably 20 to 40 days, more preferably 30 days. The acetic fermentation period less than 20 days ends up with insufficient fermentation with acetic acid bacteria and hence deterioration in the taste and aroma of the grape wine vinegar; and the acetic fermentation period greater than 40 days makes an adverse effect on the production efficiency and causes the grape wine vinegar to denature.

The reason of making about 20% room in the glass bottle is that a warm air layer in the glass bottle has a good effect in increasing the activities of acetic acid bacteria and human microbiome.

Most of all, the vinegar starter of the acetic fermentation step S40 is preferably the one prepared in the vinegar starter alcoholic fermentation step S45 and the vinegar starter aging step S46. In other words, the vinegar starter may be prepared in advance in steps equivalent or similar to the grape prep step S10, the alcoholic fermentation step S20, and the wine separation step S30.

The vinegar starter is a vinegar substance used as a starter ("seed") in the preparation of vinegar. The vinegar starter as used in the present invention is prepared by the procedures of the steps S45 and S46 and rich in acetic acid bacteria with a little quantity of disturbing bacteria, so it is capable of enhancing the acetic acid fermentation capacity.

The vinegar starter alcoholic fermentation step S45 is a step of adding sugar to the crushed grapes, sprinkling yeast over the crushed grapes, and then conducting an alcoholic fermentation.

Preferably, sugar is added to the crushed grapes to a Brix value of 20 to 30; yeast is sprinkled over the crushed grapes; the mixture is stored in a fermentation chamber at 20 to 30° C. for 20 to 30 hours to allow proliferation of the yeast; and the mixture is then tossed to mix once to five times daily over 5 to 10 days to cause an alcoholic fermentation in a sealed condition for 20 to 30 days.

The vinegar starter aging step S46 is a step of straining off the resultant alcoholic fermentation stock of the step S45 to isolate a grape wine portion and aging the grape wine portion in a sealed condition.

Preferably, the resultant alcoholic fermentation stock of the step S45 is strained off to obtain a grape wine portion; the grape wine portion is aged for 20 to 40 days; and when percent acidity reaches 5% or above, the grape wine portion is further aged for 10 to 16 months in a sealed condition.

The aging step S50 is a step of aging the resultant acetic fermentation stock. The aging method for the resultant acetic fermentation stock is not specifically limited.

Preferably, the resultant acetic fermentation stock of the acetic fermentation step S40 is, for example, aged for 2 to 8 months. More preferably, when the acetic fermentation stock of the step S40 has percent acidity of 6% or above, it is subjected to an aging for 6 months with the container closed to cut off oxygen, a third filtration using a sediment filtration, another aging for 2 months, and then a fourth filtration.

Undesirably, the fermentation period of the acetic fermentation stock less than 2 months results in insufficient production of nutrients during the fermentation process and eventually a yield of grape wine vinegar poor in nutrient components; and the fermentation period of the acetic fermentation stock exceeding 8 months makes an adverse effect on the production efficiency. Accordingly, the desirable period of the acetic fermentation is 6 months, which leads to an increase in the contents of organic acids and antioxidant components in the grape wine vinegar.

Closing the container to cut off oxygen is to increase human microbiome, which are anaerobic microorganisms. Preferably, the human microbiome may include *Lactobacillus rhamnosus, Lactobacillus acidophilus*, and *Bifidobacterium animalis*.

As known in the related art, the *Lactobacillus rhamnosus* benefits human health by relieving kidney disease symptoms, strengthening the immune system, and treating the chronic urinary track infection of menopausal women; the *Lactobacillus acidophilus* helps prevent and reduce skin diseases, allergy symptoms, and respiratory infections, has a significant anti-HP (*Helicobacter pylori*) activity, and prevents diarrhea and constipation; and the *Bifidobacterium animalis* has a powerful effect on preventing diarrhea.

As revealed from a human microbiome analysis of the grape wine vinegar prepared according to one embodiment of the present invention, the grape wine vinegar contains human microbiome having a composition of 52% *Lactobacillus acidophilus,* 43.8% *Bifidobacterium animalis*, and 4.3% *Lactobacillus rhamnosus*, and thus offers many health benefits in addition to good taste and aroma.

The filtrate of the fourth filtration process in the step S50 is the final grape wine vinegar. If not limited, it is desirable not to have the final grape wine vinegar subjected to pasteurization for the sake of protection of the human microbiome.

Hereinafter, a detailed description will be given as to the method for preparing a grape wine vinegar according to the present invention with reference to examples.

Example 1

Grape Wine Vinegar 1 Using Self-Cultured Vinegar Starter

For the preparation of the grape wine vinegar according to the present invention, 20 kg of Campbell Early grapes were removed of stems and crushed with a stemming crusher and placed in a stainless airlock fermentation container. Sugar was added to the grapes in the fermentation container to a Brix value of 24, and 5 g of yeast was sprinkled on the grapes. The mixture was stored in a fermentation chamber at 25° C. for 24 hours, allowing the yeast to proliferate. Subsequently, the grapes and the yeast in the fermentation container were tossed to mix twice daily over 7 days, subjected to an alcoholic fermentation for 30 days, and then restrained off to isolate grape wine. As a result, grape wine was obtained in an amount of about 14 L, which was about 70% with respect to 20 kg of the grapes. The grape wine had an alcohol-by-volume (ABV) of about 12%.

The grape wine thus obtained was subjected to a first low-temperature aging at about 17° C. for 3 months and then a first filtration to remove grape pulp and seeds. The first filtrate obtained by the first filtration was put into a second low-temperature aging in a closed aging container at about 17° C. for one year and then a second filtration that is a sediment filtration to isolate grape wine.

The grape wine obtained by the second filtration was poured in a narrow-mouthed container. Into about 14 L of the obtained grape wine of the second filtration was introduced about 7 L of a vinegar starter, which was 0.5 times the volume of the grape wine, to make about 20% room in the glass bottle. The grape wine incorporated with the vinegar starter was adjusted to acquire an alcohol-by-volume (ABV) of 8% and then subjected to an acetic fermentation in a fermentation chamber at 25° C. by opening and closing the bottle lid once or twice daily over 30 days. The preparation method for the vinegar starter will be described later.

When the percent acidity of the acetic fermentation stock from the acetic fermentation process reached 6% or above, with the container closed to cut off oxygen, the acetic fermentation stock was subjected to a third low-temperature aging at about 17° C. for 6 months and then a third filtration, which was a sediment filtration. Subsequently, a third filtrate obtained by the third filtration was aged for 2 months and then put into a fourth filtration to complete grape wine vinegar using a self-cultured vinegar starter.

For the preparation of the vinegar starter, sugar was added to the crushed grapes to a Brix value of 24, and yeast was sprinkled over the crushed grapes. The mixture was stored in a fermentation chamber at 25° C. for 24 hours to allow proliferation of the yeast and then tossed to mix twice daily over 7 days to cause an alcoholic fermentation in the sealed condition for 30 days. Subsequently, the resultant alcoholic fermentation stock was restrained off to isolate grape wine. The isolated grape wine was aged for 30 days. With the percent acidity of the isolated grape wine being 5% or above, the container was closed and the isolated grape wine was subjected to a low-temperature aging at 17° C. for one year to complete a vinegar starter.

Grape wine vinegars according to the following Examples 2 to 5 were prepared while the proportion of the vinegar starter with respect to the isolated grape wine of the second filtration was varied in terms of volume to volume ratio (v/v) (Table 1), which will be described later in further detail.

TABLE 1

| | Example | | | | |
|---|---|---|---|---|---|
| | 2 | 3 | 1 | 4 | 5 |
| Isolated wine (L) of second filtration | 14 | 14 | 14 | 14 | 14 |
| Volume ratio (times) of vinegar starter with respect to wine | 0.3 | 0.4 | 0.5 | 0.6 | 0.7 |
| Vinegar starter (L) | 4.2 | 5.6 | 7 | 8.4 | 9.8 |

Example 2

Grape Wine Vinegar 2 Using Self-Cultured Vinegar Starter

In the preparation process of Example 1, the volume of the vinegar starter introduced into the isolated grape wine of the second filtration was changed to be 0.3 times that of the isolated wine to prepare grape wine vinegar. That is, into about 14 L of the wine isolated by the second filtration according to Example 1 was introduced 4.2 L of the vinegar starter, which amount was 0.3 times the volume of the isolated wine. The other procedures were all performed in the same manner as described in Example 1.

Example 3

Grape Wine Vinegar 3 Using Self-Cultured Vinegar Starter

In the preparation process of Example 1, the volume of the vinegar starter introduced into the isolated grape wine of the second filtration was changed to be 0.4 times that of the isolated wine to prepare grape wine vinegar. That is, into about 14 L of the wine isolated by the second filtration according to Example 1 was introduced 5.6 L of the vinegar starter, which amount was 0.4 times the volume of the isolated wine. The other procedures were all performed in the same manner as described in Example 1.

Example 4

Grape Wine Vinegar 4 Using Self-Cultured Vinegar Starter

In the preparation process of Example 1, the volume of the vinegar starter introduced into the isolated grape wine of the second filtration was changed to be 0.6 times that of the isolated wine to prepare grape wine vinegar. That is, into about 14 L of the wine isolated by the second filtration according to Example 1 was introduced 8.4 L of the vinegar starter, which amount was 0.6 times the volume of the isolated wine. The other procedures were all performed in the same manner as described in Example 1.

Example 5

Grape Wine Vinegar 5 Using Self-Cultured Vinegar Starter

In the preparation process of Example 1, the volume of the vinegar starter introduced into the isolated grape wine of the second filtration was changed to be 0.7 times that of the isolated wine to prepare grape wine vinegar. That is, into about 14 L of the wine isolated by the second filtration according to Example 1 was introduced 9.8 L of the vinegar starter, which amount was 0.7 times the volume of the isolated wine. The other procedures were all performed in the same manner as described in Example 1.

Comparative Example 1

Grape Wine Vinegar Using Commercial Vinegar Starter

For comparison with the Example 1 depending on the vinegar starter used, a commercial vinegar starter was applied to the grape wine.

20 kg of Campbell Early grapes were removed of stems and crushed with a stemming crusher and placed in a stainless airlock fermentation container. Sugar was added to the grapes in the fermentation container to a Brix value of 24, and 5 g of yeast was sprinkled on the grapes. The mixture was stored in a fermentation chamber at 25° C. for 24 hours, allowing the yeast to proliferate. Subsequently, the grapes and the yeast in the fermentation container were tossed to mix twice daily over 7 days, subjected to an alcoholic fermentation for 30 days, and then restrained off to isolate grape wine. As a result, grape wine was obtained in an amount of about 14 L, which was about 70% with respect to 20 kg of the grapes. The grape wine had an alcohol-by-volume (ABV) of about 12%.

The grape wine thus obtained was subjected to a first low-temperature aging at about 17° C. for 3 months and then a first filtration to remove grape pulp and seeds. The first filtrate obtained by the first filtration was put into a second low-temperature aging in a closed aging container at about 17° C. for one year and then a second filtration that was a sediment filtration to isolate grape wine.

The grape wine obtained by the second filtration was poured in a narrow-mouthed container. Into about 14 L of the obtained grape wine of the second filtration was introduced about 7 L of a vinegar starter, which was 0.5 times the volume of the grape wine, to make about 20% room in the glass bottle. The grape wine incorporated with the vinegar starter was adjusted to have an alcohol-by-volume (ABV) of 8% and then subjected to an acetic fermentation in a fermentation chamber at 25° C. by opening and closing the bottle lid once or twice daily over 30 days. The vinegar starter as used herein was commercially available and purchased from an online or offline store.

When the percent acidity of the acetic fermentation stock from the acetic fermentation process reached 6% or above, with the container closed to cut off oxygen, the acetic fermentation stock was subjected to a third low-temperature aging at about 17° C. for 6 months and then a third filtration, which was a sediment filtration. Subsequently, a third filtrate obtained by the third filtration was aged for 2 months and then put into a fourth filtration to complete grape wine vinegar using a commercial vinegar starter.

Comparative Example 2

Commercial Vinegar

For comparison with the Example 1, a commercial vinegar was purchased.

Experimental Example 1

Human Microbiome Analysis (1) Human Microbiome Analysis

The grape wine vinegar prepared in Example 1 was subjected to a human microbiome analysis, which was conducted by Magrogen.

(2) Results of Human Microbiome Analysis

The results of the human microbiome analysis according to the above-stated method were as shown in FIGS. 2 and 3.

The grape wine vinegar prepared in Example 1 had *Lactobacillus rhamnosus, Lactobacillus acidophilus*, and *Bifidobacterium animalis*.

As can be seen from FIG. 3 showing the distribution chart of the human microbiome in the grape wine vinegar prepared in Example 1, the human microbiome had a composition of 52% *Lactobacillus acidophilus*, 43.8% *Bifidobacterium animalis*, and 4.3% *Lactobacillus rhamnosus*.

It was therefore revealed that the grape wine vinegar prepared in Example contained a large quantity of human microbiome with many health benefits.

Experimental Example 2

Sensory Evaluation

The vinegars prepared according to Examples 1 to 5 of the present invention were subjected to a sensory evaluation. That is, the vinegars of Examples 1 to 5 with the volumetric proportion of the vinegar starter varied according to the present invention were used in the sensory evaluation.

The sensory evaluation was performed in collaboration with Korea Food Research Institute according to the evaluation method described as follows. The results of the sensory evaluation are given in Tables 2, 3 and 4.

1. Sensory Evaluation Method (1) Evaluation period: Jul. 24-28, 2017

(2) Samples: Grape wine vinegars prepared in Examples 1 to 5; Fr-01 (Example 4), Fr-02 (Example 2), Fr-03 (Example 1), Fr-04 (Example 5), and Fr-05 (Example 3).

(3) Sensory panel: 20 panelists (4) Evaluation attributes and method: Clarity, aroma and taste were scored on a scale of 1 to 9; and overall acceptability was determined by a ranking test in the group.

A. Intensity and acceptability

Clarity: 9=extremely clear, 1=extremely cloudy

Aroma and taste: 9=extremely strong, 1=extremely weak

Acceptability: 9=like extremely, 1=dislike extremely

B. Overall acceptability: a ranking test (1=like extremely, 5=dislike extremely)

2. Results of Sensory Evaluation

As can be seen from the following Tables 2, 3 and 4, the sample Fr-02 (Example 2) had the highest color liking, and the clarity liking increased with an increase in the clarity. The samples were almost equivalent in intensity of aroma, and the taste liking increased with a decrease in the intensity of taste.

As a result, the sample Fr-03 (Example 1) that acquired high scores in both aroma and taste liking was number one in the overall acceptability. As revealed from these results, the aroma, taste, and acceptability of the grape wine vinegar are changeable as a function of the volumetric proportion of the vinegar starter with respect to the grape wine.

TABLE 2

Evaluation of the intensity and acceptability of individual attributes by Fr-products

|  | Fr-01: Example 4 | Fr-02: Example 2 | Fr-03: Example 1 | Fr-04: Example 5 | Fr-05: Example 3 |
| --- | --- | --- | --- | --- | --- |
| Color | 5.00 ± 1.32 | 7.06 ± 1.60 | 5.53 ± 1.73 | 3.25 ± 1.69 | 6.47 ± 1.18 |
| Clarity | | | | | |
| Intensity | 3.25 ± 1.69 | 6.24 ± 1.48 | 5.27 ± 1.79 | 2.31 ± 1.20 | 6.18 ± 1.63 |
| Acceptability | 3.25 ± 1.53 | 6.76 ± 1.48 | 5.33 ± 1.80 | 2.81 ± 1.60 | 6.18 ± 1.42 |
| Aroma | | | | | |
| Intensity | 5.63 ± 1.59 | 5.71 ± 1.49 | 5.87 ± 1.51 | 4.31 ± 1.74 | 5.82 ± 1.85 |
| Acceptability | 5.50 ± 1.83 | 6.24 ± 1.64 | 7.87 ± 0.99 | 6.06 ± 1.48 | 4.82 ± 1.91 |
| Taste | | | | | |
| Intensity | 7.19 ± 1.33 | 7.06 ± 1.20 | 6.67 ± 1.68 | 5.63 ± 1.67 | 6.76 ± 1.89 |
| Acceptability | 5.13 ± 1.78 | 5.82 ± 1.70 | 6.87 ± 1.77 | 6.25 ± 1.91 | 5.06 ± 1.78 |

\* Color, clarity, aroma, and taste were evaluated using a 9-point hedonic scale, where 1 = dislike extremely and 9 = like extremely.

TABLE 3

Acceptability evaluation and ranking of Fr-products regarding individual attributes

|  | Fr-01: Example 4 | Fr-02: Example 2 | Fr-03: Example 1 | Fr-04: Example 5 | Fr-05: Example 3 |
| --- | --- | --- | --- | --- | --- |
| Clarity | 3.25 ± 1.53 | 6.76 ± 1.48 | 5.33 ± 1.80 | 2.81 ± 1.60 | 6.18 ± 1.42 |
| Aroma | 5.50 ± 1.83 | 6.24 ± 1.64 | 7.87 ± 0.99 | 6.06 ± 1.48 | 4.82 ± 1.91 |
| Taste | 5.13 ± 1.78 | 5.82 ± 1.70 | 6.87 ± 1.77 | 6.25 ± 1.91 | 5.06 ± 1.78 |
| Average | 4.62 | 6.27 | 6.69 | 5.04 | 5.35 |
| Ranking | 5 | 2 | 1 | 4 | 3 |

\* Color, clarity, aroma, and taste were evaluated using a 9-point hedonic scale, where 1 = dislike extremely and 9 = like extremely.

TABLE 4

| | Overall acceptability ranking of Fr-products | | | | |
|---|---|---|---|---|---|
| | Fr-01: Example 4 | Fr-02: Example 2 | Fr-03: Example 1 | Fr-04: Example 5 | Fr-05: Example 3 |
| Average | 4.13 ± 0.72 | 2.59 ± 1.50 | 1.60 ± 0.51 | 3.06 ± 1.44 | 3.59 ± 1.42 |
| Ranking | 5 | 2 | 1 | 3 | 4 |

* Ranking method, where 1 = like extremely and 5 = dislike extremely.

As a result, the grape wine vinegar prepared according to Example 1 of the present invention was far superior in clarity, aroma, taste, liking, and overall acceptability to those of Examples 2 to 5 which had a varied volumetric proportion of the vinegar starter with respect to the isolated wine of the secondary filtration during the preparation process.

EXPERIMENTAL 3

Sensory Evaluation

A sensory evaluation was performed for the vinegars prepared according to Example 1 and Comparative Examples 1 and 2, where the vinegar of Example 1 was a grape wine vinegar using a self-cultured vinegar starter; that of Comparative Example 1 was a grape wine vinegar using a commercial vinegar starter; and that of Comparative Example 2 was a commercial vinegar.

20 professional panelists with at least 3-year experience in the food-related sensory assessments participated in the sensory evaluation using a 9-point hedonic scale method. The evaluation results are given in the following Table 5.

Color, aroma, taste, acceptability, and overall liking: 1=dislike extremely and 9=like extremely.

TABLE 5

| Div. | Example 1 | Comparative Example 1 | Comparative Example 2 |
|---|---|---|---|
| Condition | Grape wine vinegar using self-cultured vinegar starter | Grape wine vinegar using commercial vinegar starter | Commercial vinegar |
| Color | 7.79 | 7.67 | 7.42 |
| Aroma | 7.92 | 7.62 | 7.25 |
| Taste | 8.15 | 7.54 | 6.98 |
| Acceptability | 8.11 | 7.58 | 6.88 |
| Overall liking | 7.99 | 7.60 | 7.13 |

As can be seen from Table 5, the grape wine vinegar prepared by Example 1 of the present invention was superior in taste and acceptability to the vinegars of the comparative examples.

Comparative Example 1, the vinegar prepared using a commercial vinegar starter introduced into grape wine by acetic fermentation, was better in taste and acceptability than Comparative Example 2, that is, a commercial vinegar. The grape wine vinegar of Comparative Example 1 was superior in the overall liking to the commercial vinegar of Comparative Example 2, albeit not better than the grape wine vinegar of Example 1. This demonstrated that the Comparative Example 2 drove the production of grape wine vinegars with fine taste and flavor.

Accordingly, the grape wine vinegar prepared by Example 1 of the present invention was most superior to the comparative examples in terms of color, aroma, taste, acceptability, and overall liking.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method for preparing a grape wine vinegar, comprising:
a grape preparation step (S10) comprising preparing crushed grapes;
an alcoholic fermentation step (S20) comprising sprinkling yeast over the prepped grapes, storing in a fermentation chamber at 20 to 30° C. for 20 to 30 hours to allow proliferation of the yeast, and then tossing the grapes and the yeast to mix once to five times daily over 5 to 10 days to cause an alcoholic fermentation for 20 to 30 days;
a wine separation step (S30) comprising straining off a resultant alcoholic fermentation stock to obtain a grape wine portion, performing a first aging of the grape wine portion for 3 months and a first filtration, and after allowing a second aging in a sealed container for one year, performing a second filtration by natural sedimentation;
an acetic fermentation step (S40) comprising pouring the separated wine into a narrow-mouthed container, introducing a vinegar starter in an amount ranging 0.4 to 0.6 times the volume of the separated wine to acquire an alcohol-by-volume of 7 to 9%, and then opening and closing a bottle lid of the narrow-mouthed container once or twice a day over 20 to 40 days to cause an acetic fermentation; and
an aging step (S50) comprising aging a resultant acetic fermentation stock for 2 to 8 months, wherein the aging step (S50) comprises closing the lid to cut off oxygen and cause an aging to occur for 6 months when the percent acidity of the resultant acetic fermentation stock is 6% or above, performing a third filtration by the natural filtration, allowing another aging for 2 months, and then performing a fourth filtration,
wherein the vinegar starter is prepared in steps of:
(S45) adding sugar to the crushed grapes to a Brix value of 20 to 30, sprinkling yeast over the crushed grapes, storing in a fermentation chamber at 20 to 30° C. for 20 to 30 hours to allow proliferation of the yeast, and tossing the crushed grapes and the yeast to mix once to five times daily over 5 to 10 days to cause the alcoholic fermentation in a sealed condition for 20 to 30 days; and
(S46) straining off the resultant alcoholic fermentation stock of the step (S45) to obtain the grape wine portion, aging the grape wine portion for 20 to 40 days, and sealing the container when percent acidity reaches 5% or above to allow an aging for 10 to 16 months.

2. The method as claimed in claim 1, wherein,
the grape prep step (S10) comprises crushing the grapes to remove stems, placing the crushed grapes in a container, and adding sugar to a Brix value of 24,
the alcoholic fermentation step (S20) comprises sprinkling yeast over the prepped grapes, storing in a fermentation chamber at 25° C. for 24 hours to allow proliferation of the yeast, and then tossing the grapes and the yeast to mix twice a day over 7 days to cause an alcoholic fermentation for 30 days,
the acetic fermentation step (S40) comprises pouring the separated wine into the narrow-mouthed container, introducing the vinegar starter in an amount 0.5 times the volume of the separated wine to make about 20% room in a glass bottle to acquire the alcohol-by-volume of 8%, and then opening and closing a bottle lid once or twice a day over 30 days to cause the acetic fermentation.

3. The method as claimed in claim 1, wherein the grape wine vinegar comprises *Lactobacillus acidophilus, Bifidobacterium animalis*, and *Lactobacillus rhamnosus*.

4. The method as claimed in claim 2, wherein the grape wine vinegar comprises *Lactobacillus acidophilus, Bifidobacterium animalis*, and *Lactobacillus rhamnosus*.

\* \* \* \* \*